Nov. 12, 1935.   A. E. BRANDON   2,020,990
MOTOR VEHICLE LAMP
Filed April 14, 1934   2 Sheets-Sheet 1
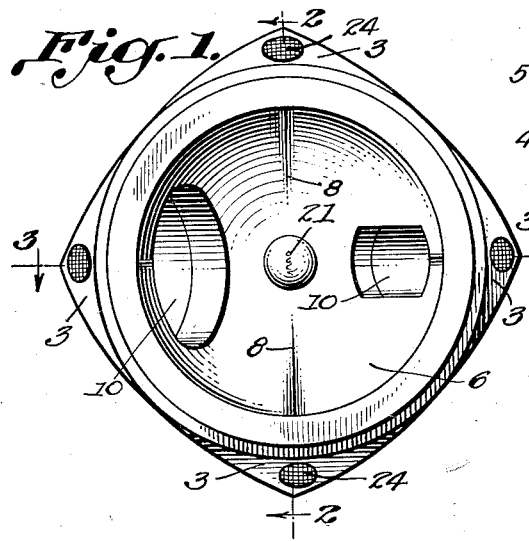
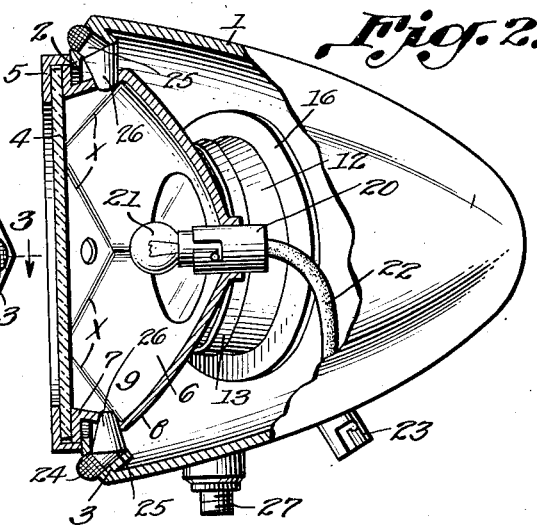
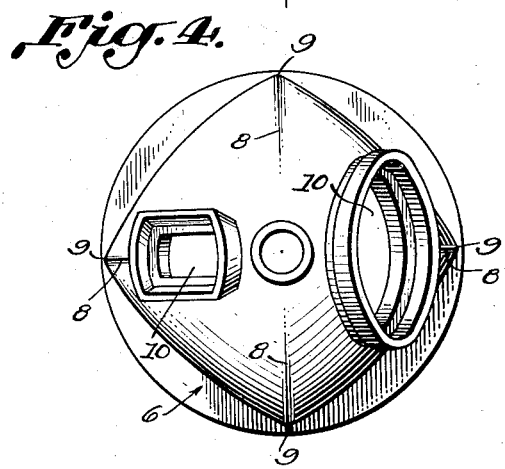
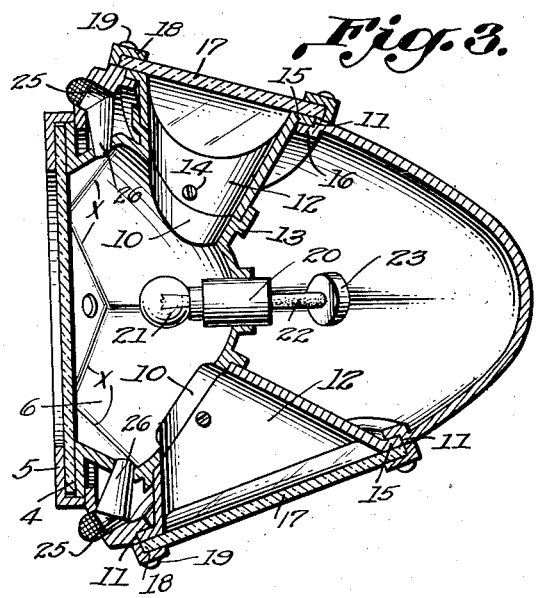
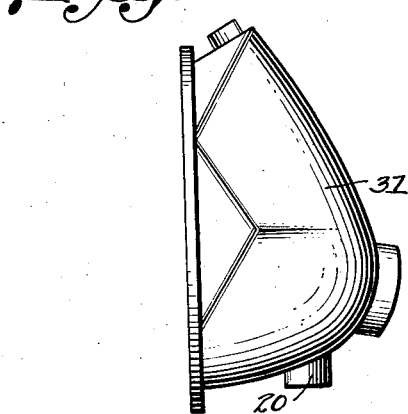
Inventor:
Alfred Edmund Brandon

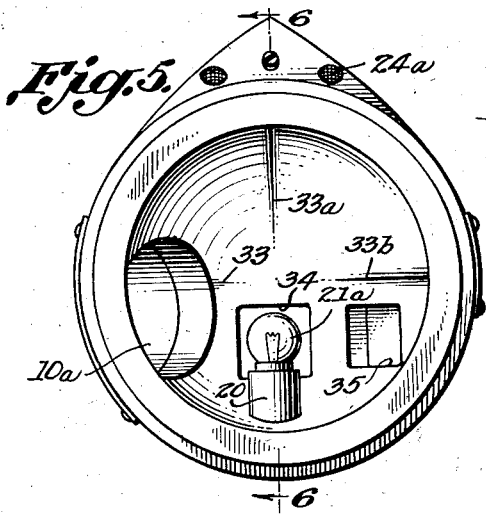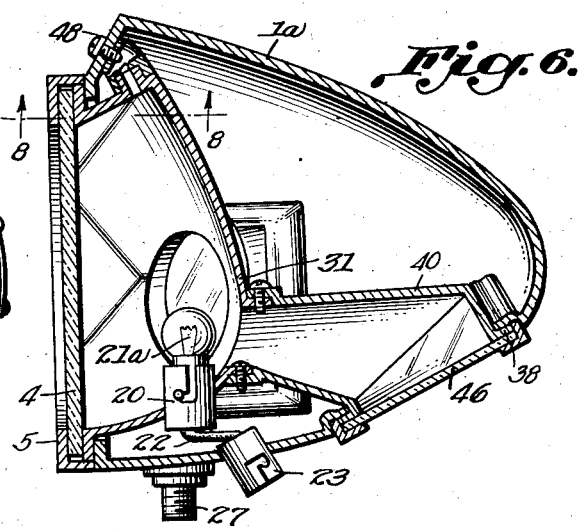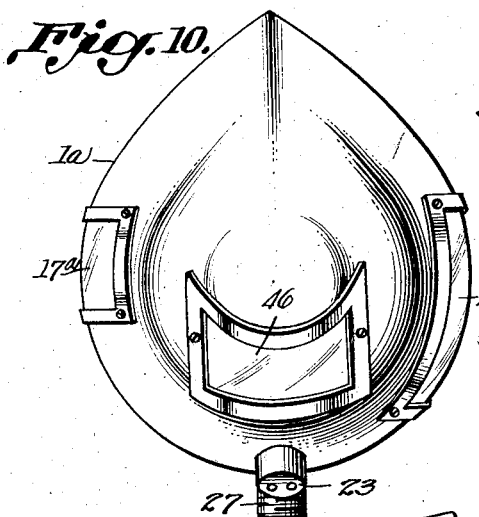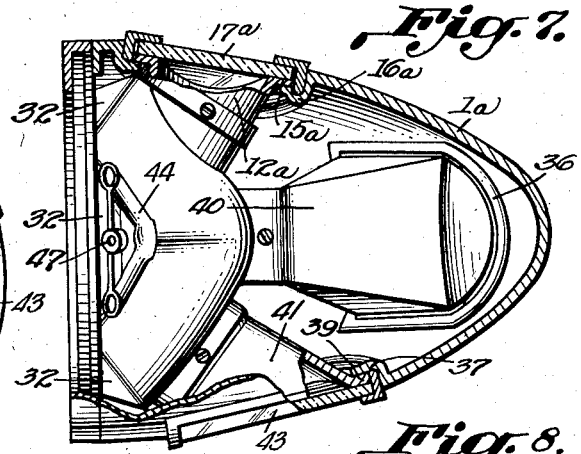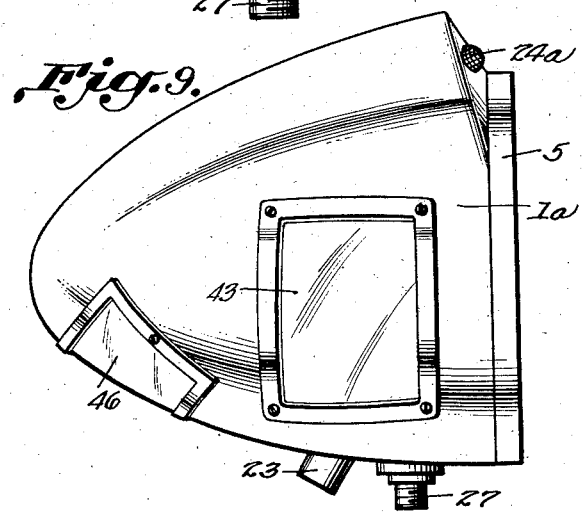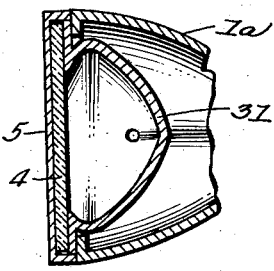

Patented Nov. 12, 1935

2,020,990

UNITED STATES PATENT OFFICE 2,020,990

MOTOR VEHICLE LAMP

Alfred Eduard Brandon, New York, N. Y.

Application April 14, 1934, Serial No. 720,517

6 Claims. (Cl. 240—7.1)

My invention relates to improvements in motor vehicle head lights, in which sleeved openings in reflector and casing associated with subreflectors of said reflector and one single source of light produce maximum even and bright beams of light in any desired direction: and in addition to that, a plurality of light lenses or indicators are provided forward of head lights; and the objects of the improvement are:

First.—To provide adequate illumination on body surfaces of vehicles equipped with the invention and therewith reduce the dangers of one eyed automobiles;—slipping while boarding cars or other vehicles;—collision with vehicles approaching at right angles or from cross roads. Also, destroying the blinding effect to the approaching drivers of cars, as it affords an illumination on body surfaces rather than the direct beams of light of head lights the driver otherwise is compelled to gaze on.

Second.—To provide a plurality of transverse projected beams of light, which by crossing the forward projected parallel beam will reduce the usual blinding effect to approaching drivers, or observers.

Third.—To concentrate the forward projected beams of light downward and over a wider road bed area and nearer the vehicle.

Fourth.—To provide a novel arrangement of light lenses or indicators, which will insure additional safety to approaching drivers of automobiles.

With these and other important objects and advantages in view; my invention consists of a head lamp constructed and arranged all as hereinafter more particularly described and illustrated in the accompanying drawings, in which:

Figure 1 is a front view of the lamp constructed according to the invention. The usual front lens and rim substantially broken off to show the interior thereof.

Fig. 2 is a vertical section of the lamp on the line 2—2 of Fig. 1. The casing is partly in elevation.

Fig. 3 is a horizontal section on the line 3—3 of Fig. 1.

Fig. 4 is a rear view of the reflector removed from the lamp.

Fig. 5 is a front view of another lamp constructed according to my invention. The usual lens and rim removed to show the interior thereof.

Fig. 6 is a vertical section on the line 6—6 of Fig. 5.

Fig. 7 is a plan view of the lamp shown in Fig. 5 the upper horizontal half of the casing is substantially broken off, illustrating the reflector and associating parts.

Fig. 8 is a horizontal section on the line 8—8 of Fig. 6 showing the contours of the subreflectors in general thereat.

Fig. 9 is a side view of the lamp shown in Fig. 5.

Fig. 10 is a rear view of the same lamp.

Fig. 11 is a side view of the reflector in the same lamp, showing the subreflectors, ribs and parabolic shape thereof.

1 is an outer casing of general parabolic form. 2 is the usual inner flange at the open front. 3 are a plurality of curved parabolic portions depressed from the parabolic surface of the casing. 4 is the usual lens and 5 the rim. 6 is a parabolic reflector disposed in the casing.

In this form of the invention: the fore portions of the casing follows in general the shape or form of the fore of the reflector which it incloses.

7 are a plurality of opposed pairs of parabolic portions depressed from the parabolic surface of said reflector. And each of which may be described as "subreflector" having a general sectional form as shown in Fig. 8.

One pair of opposed subreflector is disposed horizontally, while the other of opposed pair being vertical; although, if so desired, said pairs of opposed subreflectors may be at an angle of forty five degrees to the vertical. This is achieved by merely turning the reflector and casing into the desired position.

The subreflectors fore portion outer edge terminating at the edge of the open front of the reflector, while the opposed or rear portion curves in a manner whereby ribs 8 are constituted. The ribs 8 being extended from the parabolic central portion of the reflector to the apex 9 of the subreflectors increase or change the contour of the parabola along said directions. Said change of contour thereat produces a certain portion of diffused light onto the parallel beam of light projected forward from the parabolic central portion of the reflector.

The lines marked "X" are imaginary lines or elements indicating the course of the other contours of each subreflector. And each represents the extreme line or element extending from each apex 9 terminating at the edge of said open front and establishes, between subreflectors, the intervening neutral curvatures of the parabolic reflector thereat.

The latter contours and fore interior surfaces of the subreflectors produce additional beams of diffused light onto said parallel beam of light, which being within the reflector reduce materially the usual blinding effect the approaching driver of cars encounters.

In the reflector are a pair of opposed openings 10—10 disposed in alignment with the focal axis of the opposite subreflector thereof. 11—11 are openings formed in the wall of the casing and are considerably larger than the aligning openings of the reflector. 12—12 are sleeves or reflecting portions, which connect the aligning openings 10 and 11 respectively.

Around each opening 10 is provided a collar band or socket 13, adapted to receive one end of a sleeve 12, and is secured by screws 14 thereat. The other end of the sleeve is provided with an outer flange 15. A pressed-in portion 16 around the opening 11, is adapted to receive said flange 15, which conforms to the curvature of the casing thereat.

Said pressed-in portion 16 is further adapted to receive a lens 17 and rim 18, held secured by screws 19 to the casing.

The functions of said sleeves are: first, to concentrate beams of light, from a desired angle, onto the body surfaces of vehicles, road bed or otherwise, referred to hereinafter; second, to prevent the usual waste of the portion of the beam of light striking the inner surfaces of the outer casing during the projection from the reflector outwardly thereof; and third, to insure against the dust which may have entered the reflector from the casing thereat.

20 is the usual socket secured to the reflector. 21 is the usual illuminating bulb at focus with the reflector as well as the subreflectors. 22 is the usual wire extended to the circuit connection 23 at the casing.

It is obvious, that the subreflectors function for transverse illumination the same as the main reflector for forward illumination.

The projected beam of light from the main reflector being crossed by the independent beams of light from the subreflectors within the reflector, a portion of the projected beams of light from the upper and right and left subreflectors is obtained for illuminating the road bed nearer the vehicle forward and left and right thereof, and thereby avoiding gutters, ditches or other unsafe approaches.

The lower subreflector reflects the downward directed rays of light from the bulb upwardly onto the upper surfaces and thereby increases the illumination projected therefrom onto the road bed.

The directed rays of light from the bulb and subreflectors through the openings 10, 10 are intercepted by the surrounding walls of the sleeves 12, 12 and thence reflected outward laterally of the casing upon the body of vehicle and road bed.

Said sleeves in longitudinal section are at the upper part about horizontal, at the forward part about parallel with the vertical open front, while the lower and rear part spread out and constitute the open ends at the casing. It is obvious, said upper and forward parts concentrate the projected beams nearer the vehicle; portions of which are intercepted by said lower and rear parts and thence reflected onto said surfaces.

To approaching drivers of cars, the slightest dazzling effect of head lights causes irritation of the nerves and therefore colored light lenses or indicators 24 are disposed in the portions 3 of the casing and afford an illuminating contrast, which reduce materially such an effect.

Each of said light lenses or indicators has in the inside of the casing an annular rim or socket 25 adapted to receive one open end of the light tube 26. The other open end of the light tubes being in openings at the apex of the subreflectors and secured in any suitable manner thereat.

27 represents the usual means for mounting the lamp upon the vehicle.

By reason of the above description another form of the invention shown in the Figures 5 to 11 will be readily understood.

The center of the parabolic reflector 31 is below the longitudinal axis of the lamp and the lower inner surface of the fore portion being near the focal axis reflects the directed rays of light from the bulb 21a upwardly onto the projected forward parallel beam.

In this form three subreflectors 32 are used, of which the upper is larger than the lower opposed pair, which are of equal sizes.

The reflected rays of light from said upper subreflector will be closer to the central portion of the reflector, due to said difference.

The pair of opposed ribs 33, 33b may be at right angle with the vertical rib 33a, but preferably extend from their apex toward the central portion of the reflector, the seat of the usual glare.

Arranged in the reflector are openings 10a, 34, 35, each being in alignment with the bulb.

An advantage of this form of the invention is that in addition to the illumination provided "transversely", even illumination "longitudinally" onto the same body surfaces of vehicles is assured.

The casing 1a is provided with an upper parabolic portion adapted to receive a pair of light lenses or indicators 24a—24a forward thereof.

Around the openings in the casing are pressed-in portions 16a, 36, 37, adapted to receive the flanges 15a, 38, 39 of the sleeves 12a, 40, 41 connecting the aligning openings respectively. Lenses 17a, 43, 46 close said open ends of the sleeves at the casing.

It will be noted, that sleeve 40 is constructed so as to concentrate the projected beams of light below the windows at the sides of automobiles. The lens comforms to the contour of the casing thereat and produces illumination on the longitudinal sides of the car, its running boards, and also on the road bed longitudinally thereof.

The sleeve 41 is directed upward and is so arranged that the directed rays of light from the bulb striking the lower portion thereof are reflected upwardly into the reflector. The lens 43 is, preferably colored, and serves for warnings for drivers of vehicles approaching from the side when the lamp, illustrated, is mounted upon the left side of a vehicle.

A light tube 44, Y shape, is secured at the short open end to the reflector with the fore open ends against the light lenses or indicators 24a—24a. A bar 47 connects the ends of the tube 44 and receives a screw 48, which passes through the wall of the casing and secures the ends of the tube in place.

It is believed, that the foregoing conveys a clear understanding of the objects prefaced above.

While the constructions herein described and illustrated are the preferred forms of the device, it is obvious that various changes in the form, proportion, size, and minor details of the structures may be made without departing from the spirit or sacrificing any of the advantages of my invention.

I claim as new:

1. In a headlight, the combination of an outer casing substantially parabolic in shape having a front portion thereof depressed inwardly, a parabolic reflector within the casing, said reflector having front portions thereof depressed inwardly to form a plurality of parabolic subreflectors, ribs extending from the apices of the subreflectors toward the vertex of the parabolic reflector, an aperture in the upper portion of the reflector, a light indicator mounted in the depressed portion of the casing, a light conveying tube joining the aperture and light indicator, a plurality of aligned openings in the reflector and casing, reflecting sleeves joining corresponding openings in the reflector and casing, said sleeves diverging laterally and rearwardly in relation to the longitudinal axis of the casing and a single light source mounted substantially at the focus of the parabolic reflector and in alignment with the aperture and openings of the reflector.

2. In a headlight, the combination of a casing substantially parabolic in shape having opposed front portions thereof depressed inwardly, a parabolic reflector within the casing, said reflector having a plurality of opposed pairs of parabolically shaped subreflectors depressed inwardly from the outer forward portion thereof, said subreflectors facing the vertex of the parabolic reflector, ribs extending from the apices of the subreflectors toward the vertex of the parabolic reflector, light indicators mounted in the depressed portions of the casing, small apertures in the subreflectors aligned with said light indicators, a plurality of aligned openings in the reflector and casing, reflecting sleeves joining corresponding openings in the reflector and casing, said sleeves diverging laterally and rearwardly in relation to the longitudinal axis of the casing, and a single light source positioned substantially at the focus of the parabolic reflector and in alignment with the apertures and openings of the reflector.

3. In a headlight, the combination of a substantially parabolic outer casing having the upper front portion thereof depressed inwardly, a pair of light indicators in said depressed portion, a parabolic reflector within the casing, the upper half of said reflector having a pair of parabolically shaped subreflectors depressed inwardly from the forward portion thereof, ribs extending radially from the apices of said subreflectors toward the vertex of the parabolic reflector, an aperture in the top portion of the reflector, a Y-shaped tube joining said aperture with the pair of light indicators in the casing, a plurality of aligned openings in the reflector and casing, reflecting sleeves joining corresponding openings in the reflector and casing, said sleeves diverging laterally and rearwardly in relation to the longitudinal axis of the casing, and a light source positioned substantially at the focus of the reflector and in alignment with the aperture and openings of the reflector.

4. In a headlight, the combination of an outer casing substantially parabolic in shape having a pair of front portions thereof depressed inwardly and being in the upper horizontal portion, a light indicator mounted in each of the depressed portion of the casing, a parabolic reflector within the casing, the upper half of said reflector having a pair of parabolically shaped subreflectors depressed inwardly from the forward portion thereof, ribs extending from the vicinity of the vertex of the parabolic reflector to the apices of the subreflectors, a pair of apertures in the upper half of the reflector aligned with the said pair of light indicators of the casing, a pair of light tubes, each of which joining one of the light indicators and apertures, a plurality of aligned openings in the reflector and casing, reflecting sleeves conventionally in shape joining corresponding openings in the reflector and casing, and a single light source positioned substantially at the focus of the reflector and in alignment with the apertures and openings of the reflector.

5. In a headlight, the combination of a casing substantially parabolic in shape having opposed pairs of curved front portions thereof depressed inwardly, a parabolic reflector within the casing, said reflector having opposed pairs of parabolically shaped subreflectors depressed inwardly from the outer portion adjacent the open front thereof, ribs extending from the apices of the subreflectors toward the vertex of the parabolic reflector, colored lenses in the opposed pairs of curved front portion of the casing, light tubes having their outer open ends against said colored lenses with the inner ends open into the reflector, a pair of aligned openings in the reflector and casing, and subsidiary reflecting sleeves joining corresponding openings in the reflector and casing, said sleeves diverging laterally and rearwardly in relation to the longitudinal axis of the casing, a light source at the focus of the parabolic reflector and subreflectors and in alignment with the openings in the reflector.

6. In a headlight, the combination of a parabolic shape casing with a plurality of opposed curved front portions thereof depressed inwardly, a plurality of colored lenses in the curved front portions of the casing, a parabolic reflector within the casing, said reflector having a plurality of opposed parabolically shaped subreflectors depressed inwardly from the outer forward portion thereof, said subreflectors aligned with said curved front portions of the casing, ribs extending from the apices of the subreflectors toward the vertex of the parabolic reflector, apertures in the subreflectors, light tubes joining the apertures and said colored lenses in the casing, a plurality of opposed openings in the reflector, a plurality of opposed openings in the casing in alignment with the said openings in the reflector, subsidiary reflecting sleeves connecting corresponding openings in the reflector and casing, said subsidiary reflecting sleeves diverging laterally and rearwardly in relation to the longitudinal axis of the casing, a light source at focus with the parabolic reflector and parabolically subreflectors and in alignment with the openings of the reflector and apertures of the subreflectors.

ALFRED EDUARD BRANDON.